Patented Jan. 28, 1936

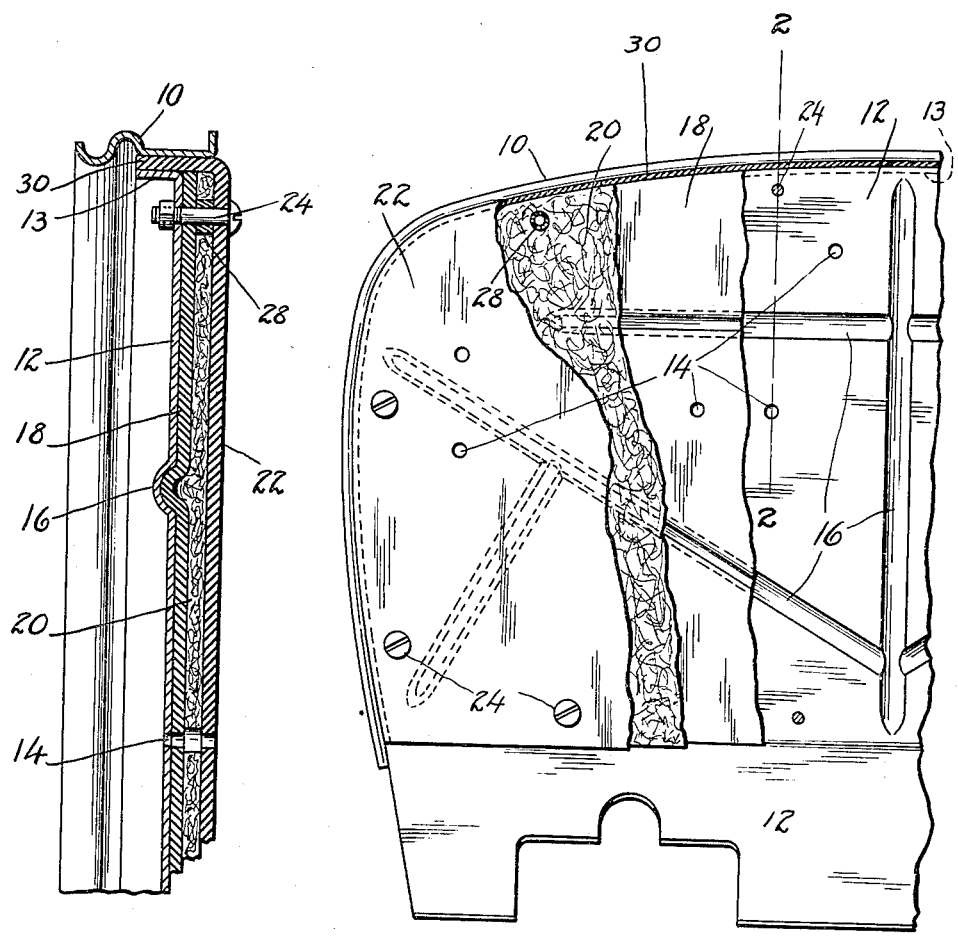

2,028,950

UNITED STATES PATENT OFFICE 2,028,950

LAMINATED PANEL

Meredith S. Randall, Detroit, Mich., assignor to Woodall Industries Incorporated, Detroit, Mich., a corporation of Michigan Application November 6, 1933, Serial No. 696,813

10 Claims. (Cl. 154—44)

My invention relates to improvements in laminated panels.

An object is to provide a laminated panel which includes a metal lamination and means arranged adjacent thereto in the form of a dense non-vibratory lamination which damps out the transmission of sound vibration.

A further object is to provide a laminated panel which is adaptable for use as a dash panel in an automobile body and which includes a metal lamination, a non-vibratory damping lamination adhesively secured to one surface of the metal lamination, a sound insulating lamination arranged adjacent thereto, and a finish lamination.

A meritorious feature resides in a construction wherein there is arranged on one side of the metal lamination an assembly which includes a pair of spaced apart laminations one of which conforms precisely with the surface contour of the metal lamination and the other of which does not and between which is arranged a layer of insulating material. The insulating material is a very loosely compacted fibrous material having high sound insulating characteristics. It is easily compressible and is filled in between the first two laminations in such quantity as to be compressed when disposed therebetween completely filling the space. The metal lamination in the construction exhibited possesses an irregularly contoured surface and the thermoplastic material, which is of a tough relatively dense character, is shaped to conform precisely therewith. The thermoplastic material functions to dampen the vibration of the metal. In the preferred form shown there is also provided a layer of sound insulating material and a second layer of thermoplastic material. This second layer of thermoplastic material is given a suitable exterior finish.

Other objects, advantages, and meritorious features will more fully appear from the following description, appended claims, and accompanying drawing, wherein:

Figure 1 is an elevation of a fragment of a panel embodying my invention in which various layers have been stripped partially away, Figure 2 is a sectional view taken on 2—2 of Figure 1.

The invention is here illustrated in a laminated panel suitable for use as an automobile dash panel. In the drawing a portion of the body frame member is shown at 10. My improved laminated panel is illustrated as embodying a metal sheet 12 which forms the rigidifying and strengthening element in the laminated panel structure and which is of a conventional character. In standard practice this metal panel is provided with a plurality of perforations such as 14 and strengthening ribs such as 16 which adapt it for the passage therethrough of conduits, controls, and the like and which give it a stable contour of the desired form to serve the purpose for which it is intended. These panels are shaped to accommodate for the positioning of different control devices and have a distinctly irregular contour. It has heretofore been proposed to render them sound and heat resistant by building them up from a plurality of laminations as illustrated in the patents.

I propose to build up a laminated panel which includes this metal sheet and one or two laminations. Adjacent thereto is placed a sheet 18 which is formed of a thermoplastic material. In the construction shown I employ a fibrous composition material which carries a large asphaltum content used as a binder to hold the cellulose fibers together. A commercial product is that known as "K B" board. This material is capable of being shaped and formed in a press and I stamp out a sheet of the material which is so shaped as to interfit completely with the irregularity of contour of the metal sheet. This "K B" sheet is then adhesively secured to one surface of the metal lamination.

I then provide a layer of loosely compacted material 20 which has high sound insulating characteristics. This is very loose fibrous cellulose material. It is secured to the outer surface of the layer 18.

There is then provided an outer finish lamination 22. This may be formed of "K B" board. This lamination would be stamped to give it the desired outer finish such as an imitation of leather or such other finish as might be desired. It is of a plain contour or embossed as may be thought best but its contour is not designed to follow that of the metal lamination 22. This lamination 22 is secured by bolts 24 or the like to the metal lamination and spacers 28 are provided so as to space it from the inner lamination 18. These bolts are so tightened down and the spacers are of such a thickness that the layer 20 of insulating material is under compression so that it completely fills the spaces between the layers 18 and 22 but it is not so compacted as to lose its insulating characteristics. The edge of the lamination 22 is turned over as at 30 so as to fill in the space between the turned over edge 13 of the metal sheet and the metal frame member 10.

The dash panel structure is then completely spaced from its encircling metal frame member 10 and it comprises the laminations heretofore set forth. It possesses an outer finished surface of tough dense material which may be given a desired finish. It possesses an inner layer of high insulating characteristics in the layer 20. The layer 18 adhesively secured to the metal sheet 12 acts to deaden the sound vibrations of the metal sheet and damps them out so that they are not transmitted from the engine compartment to the interior of the automobile body.

What I claim:

1. A laminated panel comprising, in combination, a metal lamination, a lamination of tough dense non-sound transmitting material secured to one surface of said metal lamination, a lamination of loosely compacted sound insulating material secured to said last named lamination, and a lamination of finish material arranged adjacent to said sound insulating lamination spaced from the lamination of non-sound transmitting material by means other than the intervening lamination of insulating material.

2. A laminated panel comprising a metal lamination having an irregularly contoured surface, a lamination of vibration damping material of complementary surface contour closely juxtaposed to the metal lamination, a lamination of finish material secured in spaced relationship to said damping lamination and having a dissimilarly contoured surface, a layer of loosely integrated compressible insulating material arranged between said finish lamination and said damping lamination and held in sufficient compression by said finish lamination and damping lamination to fill the irregularities therebetween and spacer elements arranged between said damping and finish laminations limiting the compression of said insulating layer.

3. A laminated structure comprising, in combination, a metal lamination, a composition asphalt fibrous lamination arranged adjacent thereto, a second composition asphalt fibrous lamination arranged in spaced relationship to said first fibrous lamination, a loosely integrated compressible fibrous insulation lamination arranged between said composition asphalt fibrous laminations, said composition fibrous laminations being secured together at their edges beyond the edge of the loosely integrated compressible lamination and provided with means holding the same in spaced apart relationship while permitting limited compression of the insulation lamination therebetween.

4. A laminated structure comprising, in combination, two composition asphalt fibrous laminations arranged in spaced relationship, a layer of loosely integrated compressible fibrous cellulose insulation material arranged between said two fibrous laminations, said two fibrous laminations being secured together at their edges enclosing said loosely integrated material and provided with means holding said two fibrous laminations in spaced apart relationship permitting limited compression of the loosely integrated insulation material while preventing undue compression thereof.

5. A laminated structure comprising, in combination, two composition asphalt impregnated fibrous laminations arranged in spaced relationship, a layer of loosely integrated compressible fibrous cellulose insulation material arranged between said two fibrous laminations, said two fibrous laminations being secured together at their edges forming a complete composition fibrous asphalt enclosure about the loosely integrated insulation material and spacers arranged within the thickness of the insulation layer permitting while limiting the compression thereof between the two outer laminations.

6. A laminated structure comprising a metal lamination, a lamination of asphalt impregnated fibrous material overlying one surface of the metal lamination, a lamination of loosely integrated easily compressible fluffy fibrous insulation material arranged adjacent thereto, a lamination of asphalt impregnated fibrous material overlying said insulation lamination, connecting means extending through the insulation lamination and placing the same under limited compression and spacer elements arranged within the thickness of the insulation lamination limiting the compression thereof by said connecting means.

7. A laminated structure comprising a core layer of loosely integrated easily compressible fibrous insulation material arranged between two layers of asphalt impregnated fibrous composition material, spacer elements arranged within the thickness of the core layer and adapted to permit while limiting the compression of the core layer between the two layers of asphalt impregnated material.

8. A laminated structure comprising a core layer of loosely integrated easily compressible fibrous insulation material arranged between two layers of asphalt impregnated fibrous composition material, spacer elements arranged within the thickness of the core layer and adapted to permit while limiting the compression of the core layer between the two layers of asphalt impregnated material and connecting means extending through said three layers and through the spacer elements maintaining the core layer under limited compression.

9. A laminated structure comprising a core layer of loosely integrated compressible fibrous insulation material arranged between two outer layers of fibrous protective material, and spacer elements arranged within the thickness of the core layer in spaced apart relationship permitting limited compression of the core layer between the outer layers while preventing undue compression thereof, and connecting means extending between the outer layers through the core layer holding the several layers together.

10. A laminated structure comprising a core layer of loosely integrated compressible fibrous insulation material arranged between two outer layers of protective material, a plurality of tubular spacer elements arranged within the thickness of the core layer between the outer layers maintaining them in spaced apart relationship preventing undue compression of the core layer therebetween, said outer layers provided with apertures registering with the apertures through the spacers, and connecting means extending through the apertures in the outer layers and through the tubular spacers connecting the outer layers together through the core layer.

MEREDITH S. RANDALL.